No. 816,583. PATENTED APR. 3, 1906.
D. KLEIN.
MILKING MACHINE.
APPLICATION FILED JULY 14, 1905.

Witnesses

Daniel Klein, Inventor.
by Attorneys

UNITED STATES PATENT OFFICE.

DANIEL KLEIN, OF WEST CHESTER, PENNSYLVANIA, ASSIGNOR OF ONE-THIRD TO MARY E. BOWMAN, OF SALEM, VIRGINIA.

MILKING-MACHINE.

No. 816,583.      Specification of Letters Patent.      Patented April 3, 1906.

Application filed July 14, 1905. Serial No. 269,659.

*To all whom it may concern:*

Be it known that I, DANIEL KLEIN, a citizen of the United States, residing at West Chester, in the county of Chester and State of Pennsylvania, have invented a new and useful Milking-Machine, of which the following is a specification.

This invention relates to milking-machines, and has for its principal object to provide a mechanism of simple and inexpensive construction in which the operation is somewhat similar to that practiced by hand, the milk being withdrawn rapidly and without danger of injury to the animal.

A further object of the invention is to provide a pulsator of such construction that the milk will be withdrawn under steady and uniform suction for short periods, alternated by quick release of the suction and pressure on the teats in order to closely follow the natural or hand method of milking.

A still further object of the invention is to provide a pulsator of such construction that when attached to a milk pail or can a vacuum may be created in the pail or can for the purpose of drawing the milk thereinto, and the pulsator may operate to temporarily break the vacuum at regular intervals for the purpose of reducing the suction effect on the teat-cups without breaking the vacuum in the pail or can.

A still further object of the invention is to provide an apparatus which may be installed in large dairies at comparatively small expense, the apparatus being so arranged that the pressure-pipe and the suction-pipe run from a central power-point throughout the length of a row of stalls, said pipes being provided at each stall with valved nipples for the reception of the flexible connecting-tubes of a portable pulsator and milk vessel, the latter being carried from stall to stall and attached to the nipples at the stall.

A still further object of the invention is to provide a pulsator which may be accurately regulated and made to work at any desired speed and to provide an automatic valve mechanism for controlling the movement of the pressure and suction pistons of the pulsator.

A still further object of the invention is to provide a novel and simple form of observation-glass through which the flow of milk into the pail and the quantity of milk in said pail may be observed.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings.

Similar numerals of reference are employed to indicate corresponding parts throughout the several figures of the drawings.

Figures 1, 5, 6:
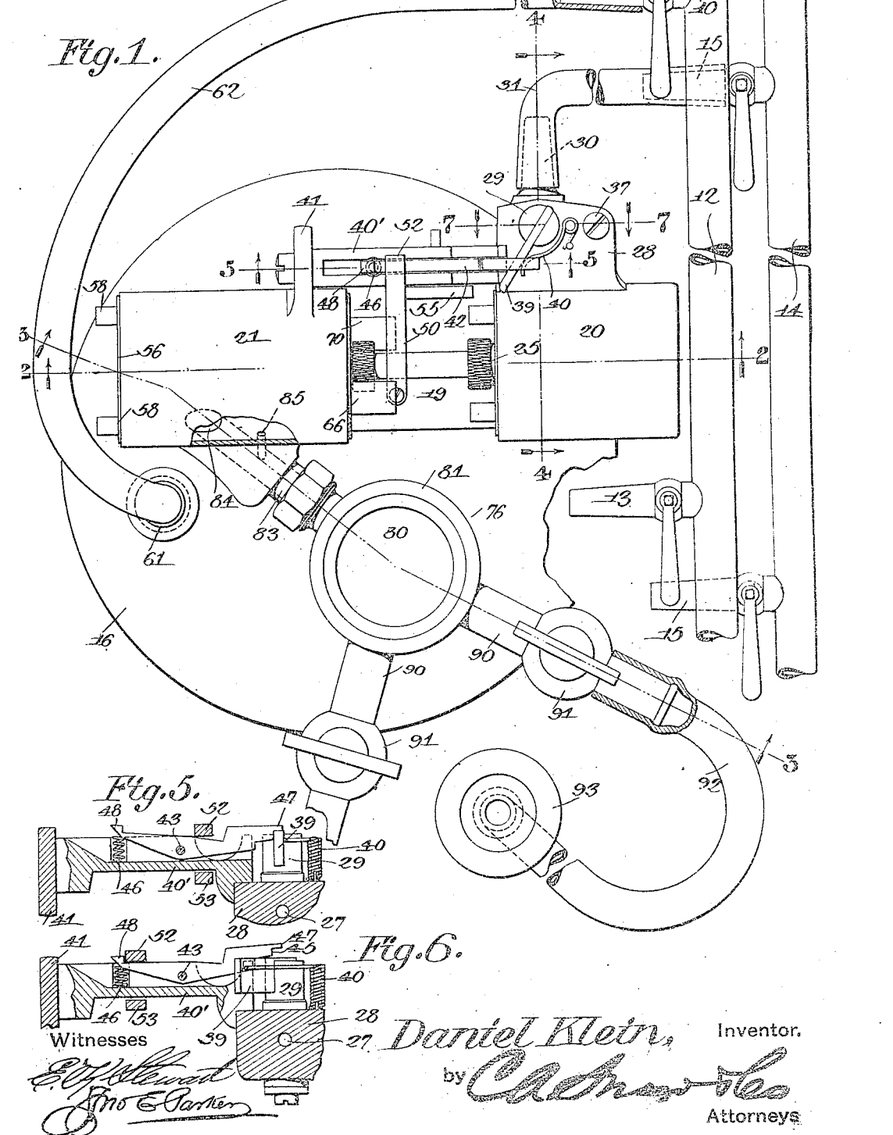
Figure 1 is a plan view, partly in section, of a milking-machine constructed in accordance with the invention.
Fig. 5 is a sectional elevation of the valve and its holding-trigger, showing the valve in closed position.
Fig. 6 is a similar view with the valve in open position.

In carrying out the present invention, especially where the apparatus is used on a large dairy-farm, a suitable air-pump is arranged at a central point, and this pump has its suction side connected to a suitable tank 10 and its compression or exhaust side to a suitable tank 11, the tanks being indicated in Fig. 1, and these tanks are arranged one to form an exhaust vessel with a vacuum of approximately sixteen inches and the other a reservoir containing compressed air at a pressure of about twenty-five pounds, and suitable automatic valves of any desired type may be employed for the purpose of maintaining the vacuum in one and the pressure in the other. The vacuum-tank is connected to a pipe 12, which leads throughout the length of the row of stalls and is provided at each stall with a valved nipple 13. The compressed-air reservoir is connected to a pipe 14, that extends parallel with the pipe 12 and is provided at each stall with a valved nipple 15. These valve-nipples are arranged at a convenient point at each stall, and the pulsator or milking apparatus is carried from stall to stall and is provided with short sections of flexible tubing which are connected to the nipples, the valves being then opened to permit the operation of the device.

The working parts of the pulsator are carried on a base-plate 16, having a suitable pendent flange 17, that fits down within the milk-pail or other vessel, a suitable gasket 18 being arranged around the flange in order to rest on top of the pail or vessel and prevent the entrance of air thereinto.

Secured to the base-plate is a plate 19, carrying two cylinders 20 and 21, that preferably are of uniform diameter, the cylinder 20 being the pressure-cylinder and the cylinder 21 the vacuum-cylinder, and within these cylinders are arranged pistons 22 and 23, respectively, the pistons being rigidly connected by a rod 24.

One end of the cylinder 20 is open, and the opposite end is provided with a suitable stuffing-box 25, through which the rod 24 passes, and leading into the cylinder at a point between the piston and its headed end is an air-inlet port 27. The port 27 leads to a valve-casing 28, that preferably is formed integral with the cylinder and contains a valve 29 for controlling the flow of air through said port. From the valve-casing projects a nipple 30, that is connected by a flexible tube 31 to the air-nipple 15 of the pressure-pipe 14, and when the valve is opened the air entering the cylinder will force the piston 22 toward the right, and this will be communicated through rod 24 to the piston 23 in the vacuum-cylinder.

Figures 4, 7, 8, 12:
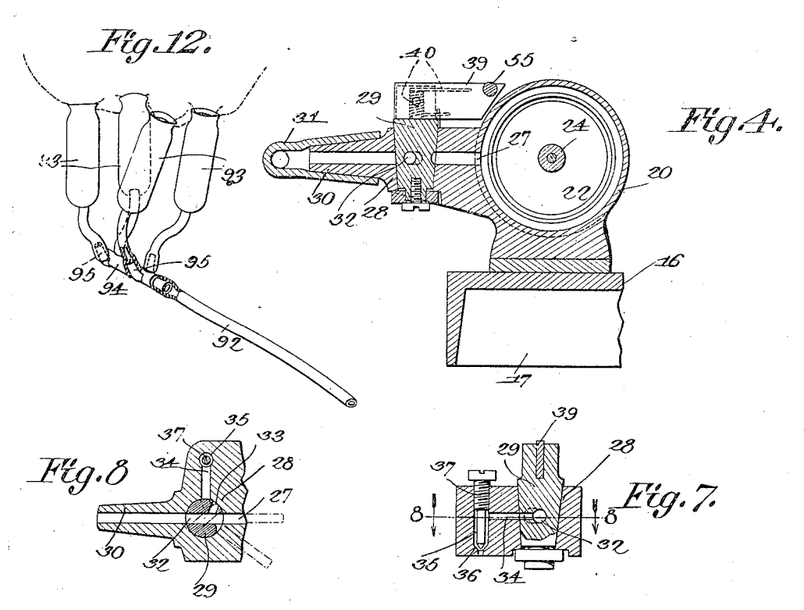
Fig. 4 is a transverse sectional view through the pressure-cylinder and its valve on the line 4 4 of Fig. 1.
Fig. 7 is a sectional view of the air-inlet valve and the needle-valve for contolling the exhaust of air from the pressure-cylinder, the section being taken on a plane indicated by the line 7 7 of Fig. 1.
Fig. 8 is a sectional plan view of the same on the line 8 8 of Fig. 7.
Fig. 12 is a detail perspective view showing the manifold connected to a plurality of teat-cups.
Figures 9, 10, 11:
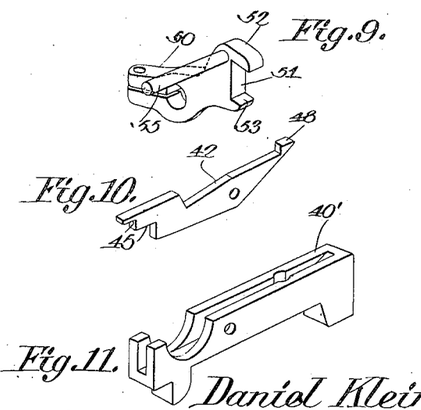
Fig. 9 is a detail perspective view of the valve-operating tappet detached.
Fig. 10 is a similar view of the valve-holding trigger.
Fig. 11 is a detail perspective view of the trigger-support.
Figure 13:
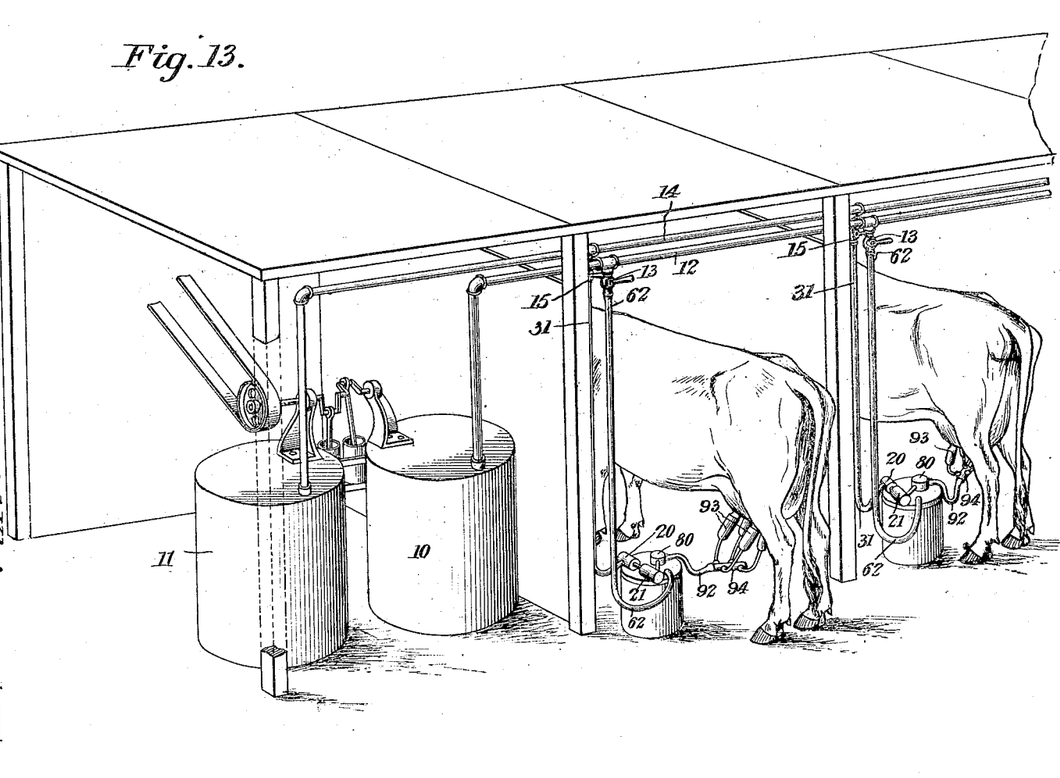
Fig. 13 is a perspective view showing the apparatus in operative position.

The valve 29 is provided with a straight diametrically-arranged port 32, which may be turned to the position shown in Fig. 8 for the purpose of allowing air to flow into the cylinder 20, and said valve is further provided with a small port 33, which when the valve is turned to the dotted-line position is placed in communication with an exhaust-port 34, formed in the valve-casing, and permits the flow of air from the cylinder 20 out through said exhaust-port. The exhaust-port 34 is provided with a vertical extension 35, having at its lower end a contracted outlet and a valve-seat 36, and at its upper end is an internal thread for the reception of the threaded upper end of a needle-valve 37, which may be turned in order to control the effective area of the exhaust-port and by controlling the rate of discharge of the air from the cylinder 20 regulate the speed at which the pulsator operates.

To the upper end of the valve is secured a projecting arm 39, which is operated upon by a spring 40, tending to move the valve to open position—that is to say, to the position shown in Fig. 1—the end of the arm 39 resting against the vertical end wall of a grooved bridge-piece 40', that extends between the valve-chamber and a lug 41, projecting from cylinder 21. The bridge-piece 40' is provided with a centrally-disposed longitudinal groove for the reception of a trigger 42, that is pivoted at a point intermediate its ends on a suitable pin 43. At one end of the trigger is a shoulder 45, which at times forms a stop for limiting movement of the arm 39 under the stress of spring 40 and maintains the valve in closed position, being the position shown in Fig. 5, and the trigger is held in this position by a helical compression-spring 46, arranged between the face of the groove and the opposite end of the trigger. The shouldered end of the trigger has a small tongue 47, which engages against the top of the arm 39 and prevents excessive downward movement of the engaging end of said trigger. That portion of the trigger between the pivot-point 43 and the spring-supported end is arranged at a slight incline, forming a cam-like surface, which terminates in a shoulder 48. When the parts are in the position shown in Fig. 5 with the valve in closed position, the inclined cam-surface is disposed at a slight angle to the horizontal upper face of the bridge-piece 40'.

To the piston-rod is secured a tappet-arm 50, the position of which may be readily adjusted lengthwise of the piston, and the outer end of said tappet-arm is provided with a groove 51, in which the front face of the bridge-piece 40' is received, said arm having upper and lower tongues 52 and 53, which ride on the upper and lower surfaces of the bridge-piece to prevent accidental displacement of the tappet-rod. The upper tongue 52 extends rearward to an extent sufficient to ride over the inclined surface of the trigger 42, and if said tappet-arm is moved from the position shown in Fig. 5 to the position shown in Fig. 6 the upper tongue 52 of said tappet will ride over the inclined cam-face of the trigger, depressing the same to the position shown in Fig. 6, and thus raising the shoulder 45 of the trigger from engagement with the arm 39, permitting said arm to move to the position shown in Fig. 6 under the influence of the spring 40, thus opening the valve and permitting a fresh charge of compressed air to enter the cylinder 20. On reversing the movement of the piston-rod the pin 55, carried by the tappet, will engage against the arm 39 and will move said arm from the position shown in Fig. 6 to the position shown in Fig. 5, thus closing the valve, and at the same time spring 46 will operate to throw the shouldered end of the trigger down, so that by the time the valve arrives at the closed position the tongue 47 will move into engagement with the top of the arm 39 and shoulder 45 will form a fixed stop to prevent return movement of said arm, so that the valve will be held closed during the return movement of the piston-rod and tappet.

The cylinder 21 is provided with two heads 56 and 57, the latter having a stuffing-box for the passage of the piston-rod, while the head 56 is provided with projecting pins 58 for the reception of a spanner for the removal or the tightening of the head. Near the outer end of the cylinder 21 is a port 59, communicating with a pipe 60, that leads directly through the base-plate and places the outer end of the cylinder in direct communication with the milk-pail or other vessel, and the base is further provided with a nipple 61, also communicating with the interior of the pail or milk-containing vessel. This nipple is connected by a flexible tube 62 to one of the nipples 13, leading from the vacuum-pipe 12, and as soon as this connection is made with the vacuum-pipe the air in the pail and in the outer end of the cylinder is exhausted, the vacuum employed being preferably about sixteen inches.

In the piston-head 57 is an air-inlet port 65, arranged at the end of a projecting tube 66, and in this port is a seat for a suction inlet-valve 67, that is held closed by a spring 68, the stress of which may be adjusted by a screw 69, adapted to an internal thread in the tube 66. The periphery of this valve has a number of grooves 70 to permit the passage of air from the port 65 to the interior of the cylinder. This valve opens to admit air to the inner end of the cylinder 21 when a partial vacuum has been created on movement of the piston 23 to the left; but the spring is so adjusted as to close the valve in advance of equalization of pressure between the outer end of the cylinder and the atmosphere, the adjustment in practice being such that a four-inch vacuum will be maintained, this being the minimum at which the valve closes. The cylinder-head 57 is also provided with an escape-port 70', having a valve 71, held in place by a spring 72, the stress of which may be adjusted by a nut 73, and by suitable adjustment of the nut the rate at which the air escapes on the stroke of the piston to the right may be adjusted, this being of value in retarding the movement of the piston under the influence of the compressed air admitted to the pressure side of the cylinder 20.

Secured to the base-plate is a small cylindrical casing 76, having an air-tight connection with the base, and the lower end of the casing has an internal thread for the reception of a ring-nut 77, which serves as a support for an observation-glass 78, a suitable packing-ring 79 being introduced between the lower face of the glass and the ring. At the top of the casing is a second observation-glass 80, held in place by a gland-nut 81, an air-tight joint being formed by a packing-ring 82, and as the two glass panels are in alinement the contents of the pail or other vessel may be observed. This casing 76 forms a chamber of which the panel 78 constitutes the floor and the panel 80 the top, and said chamber is connected by a suitable pipe 83 to a port 84 in communication with the outer end of the cylinder 21 at a point adjacent to the port 59. This port 84 is arranged to be covered by the piston 23 at the completion of each full stroke of the latter; but when the piston moves to the right the ports 84 and 60 are placed in communication with each other, so that the air is exhausted from the casing 76. Between the cylinder 21 and the port 84 leads a by-pass 85 of comparatively small area and arranged to be uncovered on each outstroke of the piston 23, and this by-pass when uncovered places the port 84 and casing 76 in communication with the outer air through the valved port 65 at the end of the cylinder, so that when the piston is at the left-hand end of the stroke the vacuum in the casing 76 is reduced to a minimum, controlled by the spring 68 and nut 69—that is to say, four inches in practice—but when the piston is at the opposite end of the stroke and the by-pass 85 is closed the vacuum in the chamber 76 will be approximately sixteen inches.

Leading from the casing 76 are a number of nipples 90, having valves 91, there being any desired number of such nipples, and each nipple is connected by a flexible tube 92 to one or more teat-cups 93, which may be of any desired construction. While each tube may be connected to a single cup, it is preferable to employ a manifold 94 in the form of a metallic tube arranged at the end of the flexible tube 92 and provided with a number of nipples 95, to each of which a teat-cup may be attached.

Figure 2:
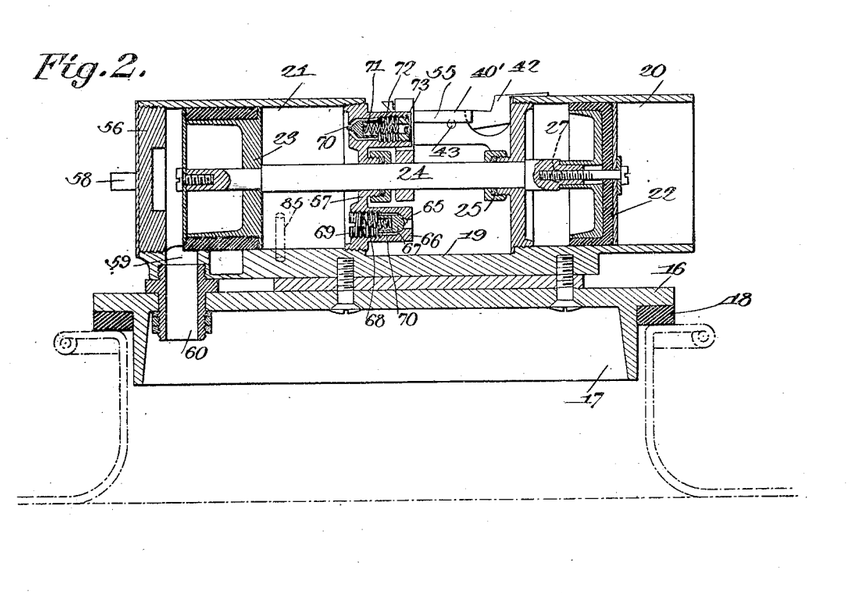
Fig. 2 is a sectional elevation of the pressure and vacuum cylinders on the line 2 2 of Fig. 1.
Figure 3:
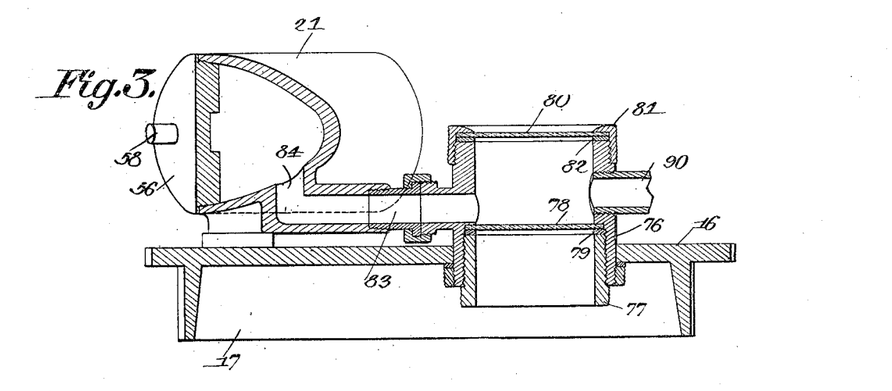
Fig. 3 is a similar view on the line 3 3 of Fig. 1.

In the operation of the pulsator the flexible tubes 31 and 62 are first connected to the nipples 30 and 61, respectively, and then the valves at the nipples 13 and 15 are moved to open position, placing the milk-pail or other vessel in communication with the vacuum-pipe and the valve-casing 28 in communication with the compressed-air pipe. The air in the pail will be exhausted, and if the pistons are in the position shown in Fig. 2 air will be admitted through the port 27 and will force the piston 22 to the right, said piston carrying with it the piston 23 and the speed of the latter being governed to some extent by the adjustment of the nut 73 and the rapidity with which the air can escape from the cylinder 21 in advance of said piston 23.

This stroke uncovers the port 84 and covers port 85, placing the casing 76 and the teat-cups, which have previously been adjusted to position, in communication with the suction-pipe, so that the teat-cups will be held firmly in place and the milk will start to flow. The movement of the pistons to the right causes the piston-rod 24 to move in the same direction, and the tappet 50 carries the pin 55 into engagement with arm 39, moving the valve 29 to closed position, and shoulder 45 of the trigger engages the valve and holds the same closed. This movement places port 33 of the valve in communication with the exhaust-port 34, and the air is allowed to escape from cylinder 20 through the escape-port at a rate determined by the adjustment of the needle-valve 37. The movement of the piston is induced by the entrance of atmospheric air into the cylinder 21 through the port 65, there being a vacuum or partial vacuum at the opposite exhaust end of the cylinder. The air gradually entering through port 65 causes the piston 23 to travel to the left, and after a time the port 84 is closed, cutting off communication between the milk-pail and the teat-cups. Following this the by-pass 85 is opened, allowing the air at the end of the cylinder to flow into the port 85 and from thence pass to the teat-cups. The valve which controls the flow of air through the port 65 is adjusted to close when the vacuum at the right-hand end of cylinder 21 has been reduced to about four inches, so that while the vacuum in the cups is reduced there is no equalization with natural atmospheric pressure and there is still sufficient vacuum to hold the teat-cups in place. The suction-strain, however, and the pressure in the cups are lessened momentarily. The by-pass 85 is opened for a very short time, and as soon as the opening movement occurs the tongue 52 of the tappet, having traveled under the cam-shaped end of the trigger 42, moves the same down, raising the shoulder 45 from engagement with the valve-arm 39, whereupon said arm is actuated by the spring 40 and the valve instantly moved to open position, allowing the air under pressure to again enter the cylinder 20 and force the piston 22 to the right. This immediately cuts off the port 85, inasmuch as piston 23 moves quickly to the right and port 84 is again opened, establishing communication between the exhausted or partly-exhausted milk-pail and the teat-cups and renewing the suction in the cups.

The operation is repeated as long as may be necessary, after which the valves of the nipples 13 and 15 are closed and the tubes 31 and 62 are removed, allowing atmospheric air to enter the pail and all of the tubes, so that the teat-cups may be readily removed, the valves 91 of the teat-cup connections being closed. The apparatus may then be carried to another stall for operation on another animal.

Having thus described the invention, what is claimed is—

1. In a milking-machine, a pulsator having air-exhaust and compressed-air connections, and provided with a milk-tube connection, means for maintaining the milk-tube in communication with the air-exhaust, and for admitting to the milk-tube a quantity of air at predetermined intervals, without raising the pressure within the tube to that of the atmosphere.

2. In a device of the class specified, a pulsator having air-exhaust, compressed-air, and milk-tube connections, said pulsator having means for placing the milk-tube and air-exhaust in communication, and for cutting off such communication and reducing the degree of air exhaustion, the periods of high and low exhaustion alternating.

3. In apparatus of the class described, a pulsator having air-exhaust, compressed-air, and milk-tube connections, and a piston-valve forming a part of the pulsator and arranged to alternately open communication between the air-exhaust and the milk-tube, and the outer air and the milk-tube.

4. In a device of the class specified, a pulsator having air-exhaust, compressed air, and milk-tube connections, a piston-valve forming a part of such pulsator and serving to alternately establish communication between the air-exhaust and the milk-tube, and the outer air and the milk-tube, and means for closing the outer air connection in advance of the equalization of the milk-tube with atmospheric pressure.

5. In apparatus of the class described, the combination with a milk-tube, of a pulsator having pressure and vacuum cylinders, a pair of connected pistons arranged in said cylinders, air-exhaust and compressed-air connections leading to the vacuum and pressure cylinders, respectively, ports arranged in the vacuum-cylinder, one of said ports leading to the milk-tube, and the other to the outer air, the piston of the vacuum-cylinder serving as a valve for placing the milk-tube alternately in communication with the air-exhaust and with the air-inlet port.

6. In a device of the class specified, the combination with pressure and vacuum cylinders, of a pair of connected pistons arranged in said cylinders, air-exhaust and compressed-air connections leading, respectively, to the vacuum and pressure cylinders, a milk-tube, also, having ported communication with the vacuum-cylinder, an air-port under the control of the piston of the vacuum-cylinder for admitting air to the milk-tube, and means for controlling the pressure of the air admitted through said port.

7. In apparatus of the class described, the combination with vacuum and pressure cylinders, of air-exhaust, and compressed-air connections leading, respectively, to said vacuum and pressure cylinders, a milk-tube connection having a terminal port opening into the vacuum-cylinder, an air-port, also, communicating with the milk-tube and opening into the vacuum-cylinder, and a self-closing pressure-regulating valve for admitting air to that portion of the vacuum-cylinder with which said air-port communicates.

8. In apparatus of the class described, the combination with vacuum and pressure cylinders, of a pair of connected pistons arranged in said cylinders, air-exhaust and compressed-air connections leading to the vacuum and pressure cylinders, respectively, a milk-tube having a terminal port opening into the vacuum-cylinder, an air-port communicating with the milk-tube, and, also, opening into the vacuum-cylinder, the piston of the vacuum-cylinder serving as a valve for alternately placing the milk-tube in communication with the air-exhaust, and, with the air-port, and an automatic means for controlling the pressure of air admitted through said air-port to the milk-tube.

9. In a device of the class specified, the combination with vacuum and pressure cylinders, of a pair of connected pistons arranged in said cylinders, air-exhaust and compressed-air connections leading to the vacuum and pressure cylinders, respectively, a milk-tube having a terminal port communicating with the vacuum-cylinder, an adjustable self-closing pressure-regulating valve for admitting air to one end of the vacuum-cylinder, and an air-port extending from the vacuum-cylinder to the milk-tube port and under the control of the piston of the vacuum-cylinder.

10. In apparatus of the class described, the combination with vacuum and pressure cylinders, of a pair of connected pistons arranged in said cylinders, a compressed-air connection leading to the pressure-cylinder, an air-exhaust port leading to one end of the vacuum-cylinder, a self-closing pressure-regulating valve arranged at the opposite end of the vacuum-cylinder, and serving to admit a quantity of air, but closing before the pressure in the vacuum-cylinder is equal to atmospheric pressure, a milk-tube port communicating with the vacuum-cylinder, and a port or by-pass leading from the air-entrance end of the vacuum-cylinder to the milk-port, said ports being under the control of the piston of the vacuum-cylinder.

11. In a device of the class specified, the combination with vacuum and pressure cylinders, of a pair of connected pistons in said cylinders, a fluid-pressure port communicating with the pressure-cylinder, an air-exhaust port communicating with one end of the vacuum-cylinder, a partial vacuum at the end of the vacuum-cylinder tending to induce movement of both pistons in one direction and the pressure of the fluid in the pressure-cylinder tending to force both pistons in the opposite direction, a milk-tube port opening into the vacuum-cylinder and under the control of the piston therein, a pressure-regulating valve for admitting air to that end of the vacuum-cylinder opposite the air-exhaust port, said valve closing before the air in the cylinder has reached atmospheric pressure, and a port or by-pass under the control of the piston of the vacuum-cylinder and serving to establish connection between the milk-port and the air end of the vacuum-cylinder.

12. In apparatus of the class described, the combination with vacuum and pressure cylinders, of a pair of connected pistons in said cylinders, a fluid-pressure-supply port leading to the pressure-cylinder, a valve for controlling the flow of the fluid-pressure through said port, an air-exhaust connection at one end of the vacuum-cylinder, an air-inlet arranged at the opposite end of the vacuum-cylinder, milk-tube and air ports arranged in the vacuum-cylinder and under the control of the piston therein, and automatic means serving to open the fluid-pressure valve and admit fluid-pressure to the pressure-cylinder when the air-port of the vacuum-cylinder is uncovered.

13. In apparatus of the class described, the combination with the vacuum and pressure cylinders, of a pair of connected pistons in said cylinders, a valved port for supplying fluid under pressure to the pressure-cylinder, an air-exhaust port arranged at one end of the vacuum-cylinder, an automatically-closable valve arranged at the opposite end of the vacuum-cylinder and serving to admit air thereto, milk-tube and air ports leading to the vacuum-cylinder and under the control of the piston therein, and mechanism for automatically opening the pressure-controlling valve after the milk-tube port has been closed and the air-port of the vacuum-cylinder opened.

14. In apparatus of the class described, a vacuum-cylinder, a piston therein, an air-exhaust connection at one end of the cylinder, an air-inlet at the opposite end of the cylinder, milk-tube and air ports communicating with the cylinder, the air-port being arranged to communicate with the air-inlet cylinder, and being connected to the milk-tube port, said piston serving to alternately place the milk-tube connection in communication with the air-exhaust connection, and with the air-port, means for retarding movement of the piston in the direction of the air-exhaust connection, and means for effecting a quick return of the piston after momentary opening of the air-port.

15. In apparatus of the class described, a milk-receptacle, an air-exhaust communicating therewith, a vacuum-cylinder connected to the milk-receptacle, a milk-tube having a port opening into one end of the vacuum-cylinder, a piston arranged in the vacuum-cylinder and serving when moved in one direction to open said milk-port and permit the flow of milk into the receptacle, and an air-port, also, under the control of the piston, said port being open when the milk-port is closed, to partly break the vacuum in the milk-tube without increasing the pressure in the receptacle.

16. In a milking-machine, a milk-receptacle, an air-exhaust communicating therewith, a vacuum-cylinder, a port opening into the cylinder, an air-port extending between the cylinder and the milk-tube, a piston arranged in the cylinder and movable in one direction by the reduction of pressure in the receptacle, means for retarding such movement and permitting communication between the milk-port and the receptacle for a comparatively long period, the milk-port being closed by the piston in advance of the air-port, and means for effecting a quick return movement of the piston and the closing of the air-port in advance of the opening of the milk-port.

17. In apparatus of the class described, the combination with a milk-receptacle, having an air-exhaust connection, of a vacuum-cylinder connected to the receptacle, a milk-tube having a port opening into the cylinder, an air-port for establishing communication between one end of the cylinder and the milk-tube, a piston arranged within said cylinder and serving as a valve for controlling communication between the milk-port and the receptacle connection and between the milk-port and the air-port, there being a pair of valved ports arranged at that end of the cylinder with which the air-port communicates, and serving, respectively, for the admission and discharge of air.

18. In apparatus of the class described, the combination with a milk-tube having a terminal port, of a suction-port, and an air-port, a valve for controlling communication between the milk-port, the suction-port and the air-port, a pressure-cylinder, a piston arranged therein and connected to the valve, a valve for controlling the admission of an actuating fluid to said cylinder, an automatic valve-operating means, and means for controlling the escape of the fluid from the cylinder, and thus timing the operation.

19. In apparatus of the class described, the combination with a casing having a suction-port, a milk-port, and an air-port, of a valve for controlling communication of the milk-port alternately with the suction-port and the air-port, a pressure-cylinder, a piston arranged therein and connected to the valve, a valve for controlling the flow of fluid under pressure to said cylinder, means for opening and closing said valve, and an escape-port leading from the cylinder and having an adjustable valve for regulating the speed at which the fluid discharges from the cylinder.

20. In apparatus of the class described, the combination with vacuum and pressure cylinders, of pistons arranged in the cylinders, a piston-rod connecting the two pistons, a suction-port, a milk-port, and an air-port, all leading into the vacuum-cylinder, and under the control of the piston therein, a pressure-port leading to the pressure-cylinder, a valve for controlling the flow of fluid under pressure through said pressure-port, and means carried by the piston-rod for controlling the movement of said valve.

21. In apparatus of the class described, the combination with vacuum and pressure cylinders, of a pair of pistons arranged therein, a rod connecting said pistons, a suction-port, a milk-port, and an air-port, all communicating with the vacuum-cylinder and under the control of its piston, a valve for controlling the flow of fluid under pressure into the pressure-cylinder, a trigger for maintaining the valve in closed position, a valve-opening member, and means for tripping said trigger and permitting opening movement of the valve when the pistons have completed their stroke in one direction.

22. In apparatus of the class described, the combination with vacuum and pressure cylinders, of a pair of pistons arranged in the cylinders, a piston-rod connecting said pistons, a suction-port, a milk-port, and an air-port, all in communication with the vacuum-cylinder and under the control of its piston, a valve for controlling the flow of fluid under pressure into the pressure-cylinder, a spring for opening said valve, a trigger for maintaining the valve in closed position, and a tappet member carried by the piston-rod and serving to move the trigger to release position at the completion of the stroke of the piston in one direction.

23. In apparatus of the class described, the combination with vacuum and pressure cylinders, of pistons arranged in said cylinders, a rod connecting said pistons, a suction-port, a milk-port, and an air-port all communicating with the vacuum-cylinder and under the control of its piston, a valve for controlling the flow of fluid under pressure to the pressure-cylinder, a spring for opening the valve, a pivotally-mounted trigger having at one end a shoulder for engaging and holding the valve in open position, the opposite end of said trigger having an inclined cam-face, and a tappet carried by the piston-rod and arranged to ride over said cam-face and release the trigger after the completion of the stroke of the pistons in one direction.

24. In mechanism of the class described, a pressure-cylinder, a piston arranged therein, a piston-rod, a valve member connected to the piston-rod, a valve for controlling the flow of fluid under pressure into said cylinder, said valve having both inlet and escape ports, a spring tending to move the valve to open position, a pivotally-mounted trigger-bar having a shoulder for engaging the valve and maintaining the same in closed position, said trigger having an inclined cam-face, and means carried by the piston-rod for engaging said cam-face to trip the trigger and permit opening movement of the valve.

25. In apparatus of the class described, the combination with a fluid-pressure cylinder, of a piston arranged therein, a piston-rod, a valve member connected to said piston-rod, a valve for controlling the flow of fluid under pressure into the cylinder, said valve having both inlet and escape ports, an adjustable means for controlling the escape of fluid through said port, a spring tending to move the valve to its open position, a pivotally-mounted trigger-bar having a shoulder for engaging and locking the valve in closed position, said trigger-bar having an inclined cam-face at that end opposite the shoulder, a tappet member carried by the piston-rod and serving by engagement with said cam-face to trip the trigger, and a valve-closing pin carried by said tappet-arm.

26. In apparatus of the class described, the combination with a fluid-pressure cylinder, of a piston arranged therein, a piston-rod connected to said piston, a valve member under the control of said piston-rod, a valve for controlling the flow of fluid under pressure to, and the exhaust from, said cylinder, an arm projecting from said valve, a spring acting on the arm and tending to move the valve to open position, a pivotally-mounted trigger-bar having at one end a shoulder for engaging the arm, and a tongue for limiting movement of said trigger, an inclined cam-face arranged at the opposite end of the trigger-bar, a tappet carried by the piston-rod and arranged to engage said cam-face, and a pin projecting from the tappet and adapted to engage the valve-arm and move said valve to closed position.

27. In apparatus of the class described, the combination with a fluid-pressure cylinder, of a piston arranged therein, a piston-rod, a valve member connected to the piston-rod, a valve for controlling the flow of fluid under pressure into, and the exhaust from said cylinder, an arm projecting from said valve, a spring engaging the arm and tending to move the valve to open position, a trigger for holding the valve in closed position, means carried by the piston-rod for tripping the trigger, a pin operable by the piston-rod for engaging and moving the valve to closed position, and an adjustable needle-valve for controlling the exhaust from said pressure-cylinder.

28. In apparatus of the class described, a pulsator having a means for controlling the flow of milk, a base-plate to which the pulsator is secured, said base-plate being arranged to form the cover of a milk-receptacle, and a casing carried by the base-plate and provided with transparent upper and lower walls for the ready inspection of the contents of the pail, said casing forming a portion of the milk-duct and permitting inspection of the milk as it flows toward the receptacle.

29. In apparatus of the class described, a base-plate arranged to form the cover of a milk-receptacle, a casing secured to the base-plate and having upper and lower transparent walls to permit inspection of the contents of the receptacle, a milk-tube discharging into the casing at a point between said upper and lower walls, and a suction-tube leading outward from said casing, whereby the rate of flow of the milk may be observed.

In testimony that I claim the foregoing as my own I have hereto affixed my signature in the presence of two witnesses.

DANIEL KLEIN.

Witnesses:
N. W. PHELPS,
TH. ENGLISH.